(12) United States Patent
Caro

(10) Patent No.: US 12,708,945 B2
(45) Date of Patent: Aug. 18, 2026

(54) SYSTEM FOR COLLECTING DEBRIS

(71) Applicant: Klein Tools, Inc., Lincolnshire, IL (US)

(72) Inventor: Juan Sebastian Caro, Dallas, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 404 days.

(21) Appl. No.: 18/478,663

(22) Filed: Sep. 29, 2023

(65) Prior Publication Data

US 2025/0108443 A1 Apr. 3, 2025

(51) Int. Cl.
*B23B 47/34* (2006.01)

(52) U.S. Cl.
CPC .................................... *B23B 47/34* (2013.01)

(58) Field of Classification Search
CPC .... B23B 47/34; B23Q 11/0046; Y10T 408/50
See application file for complete search history.

(56) References Cited

U.S. PATENT DOCUMENTS 3,490,779 A * 1/1970 Bixby ................ B23Q 11/0046 279/96
3,583,821 A * 6/1971 Shaub ................ B23Q 11/0816 408/72 R
5,653,561 A * 8/1997 May ................... B23Q 11/0046 408/72 R
6,413,022 B1 * 7/2002 Sarh ........................ B25B 5/006 408/97
2004/0141820 A1 * 7/2004 Mikon ............... B23Q 11/0046 408/67
2011/0023911 A1 * 2/2011 Lenkeit .................. B23Q 11/10 134/21
2014/0093320 A1 * 4/2014 Sullivan ............. B23Q 11/0046 408/67
2015/0360298 A1 * 12/2015 Buczek ................... B23B 47/34 15/301
2016/0015231 A1 * 1/2016 King .................. B23Q 11/0046 15/246.2
2017/0368655 A1 * 12/2017 Bergman .............. B23B 45/003
2018/0056464 A1 * 3/2018 Witter ................ B23Q 11/0046
2019/0366575 A1 * 12/2019 Jansson .............. B23Q 11/0825
2020/0230765 A1 * 7/2020 Sonntag .............. B23B 51/0493
2021/0069844 A1 * 3/2021 Luu .................... B23Q 11/0071

* cited by examiner

*Primary Examiner* — Sarang Afzali
*Assistant Examiner* — Darrell C Ford

(57) ABSTRACT

A system for collecting debris produced during a cutting operation and having a shield to be placed against a surface so that the shield and surface cooperatively define an accumulation volume. The shield has an opening communicating from the accumulation volume to externally of the shield. First, second, and third different connectors are releasably operatively engageable with an adaptor, one in place of the others, whereby a communication path is defined from the accumulation volume through the at least one shield opening and into the selected one of the first, second, and third connectors that is releasably operatively engaged with the adaptor. The communication path is usable to direct debris produced from cutting from the collection volume to a location externally of the shield.

16 Claims, 9 Drawing Sheets

SHIELD 12
BODY 22
OPENING(S) 26
ADAPTOR 30
ADAPTOR 30
CONDUIT 34a
CONNECTOR 32a
PASSAGE 36a
CONNECTOR 32b
CONDUIT 34b
PASSAGE 36b
10

SHIELD 12
BODY 22
VOLUME 24
SURFACE 16
COMPONENT 14

ROTARY CUTTING TOOL 18
DRIVE 20

ADAPTOR 30
SURFACE 40a
SURFACE 40b
CONDUIT 34a
CONNECTOR 32a
SURFACE 38a
PASSAGE 36a
CONDUIT 34b
CONNECTOR 32b
SURFACE 38b
PASSAGE 36b

ADAPTOR 30
SURFACE 40c
CONNECTOR 32c
SURFACE 38c
CONDUIT 34c
PASSAGE 36c

DRIVE 20
ROTARY CUTTING TOOL 18
SURFACE 16
COMPONENT 14
12
24
42
52
48
44
54
56
46
22
24
26
70
72
75
62
76
66
84
30
40"
60
80
64
78
96
40'
40'''
40⁴
82
74a
68
50
74b

18a

18c 86
88
32(1)
38"(1)
92
90
38'(1)

34
D
VACUUM SOURCE 94
40(x)
B
A

40(y)
B
A

SYSTEM FOR COLLECTING DEBRIS

BACKGROUND OF THE INVENTION

Field of the Invention

This invention relates to debris collecting systems and, more particularly, to a system for confining and collecting debris generated while cutting through a surface on a component, such as drywall.

Background Art

For health reasons, there has been a growing trend towards preventing worker exposure to dust and fine debris generated on work sites. Without limitation, one category of this work has been particularly focused upon—the cutting of panels such as drywall.

Once drywall is hung, it is common to thereafter form holes therethrough to accommodate components, such as recessed light fixtures. The holes are commonly formed through the drywall by using a rotary cutting tool which in some forms can be adjusted to produce holes varying in diameter over a built-in range. Hole boring in typical construction materials, including wood, composites, drywall, etc., generates a substantial amount of dust and light debris. This is particularly a problem when the holes are formed in ceilings where workers are required to advance a drilling tool overhead whereupon the generated dust and debris drops downwardly directly towards the tool operator.

To address this particular issue, shields have been devised which are generally cup-shaped in nature and pressed against the surface through which the cut is formed. Dust and debris is progressively accumulated in a space bounded by the shield and the wall being cut. The cutting tool is typically operated within the volume bounded cooperatively by the wall surface and the shield placed conformingly thereagainst.

One category of this type of debris collection system—a closed system—requires the user to empty the shield after a task is completed to dispose of the accumulated dust and debris.

Another category of this apparatus continuously draws the dust and debris from the accumulation volume as it is progressively generated. Conventional type vacuums are utilized with flexible conduits that are connected to the shield. A generated low-pressure region causes the dust and debris to discharge from the volume, defined by the shield and surface of the component being operated upon, and directed to a collection location.

This latter category of apparatus is widely used. Many entities offer their own version of this apparatus including different conduit sizes with different connections that are releasably engaged with the shield structures to draw away the dust and debris. Each shield is designed to accommodate a single connector configuration and size. Thus, different shields to accommodate the different conduits must be offered.

Commonly, the shield and associated structure and vacuum source, including connecting conduits, are available for purchase as separate units. Thus, upon purchasing a shield structure, options exist as to manufacturers of the vacuum sources. Currently, many different entities offer vacuum sources while many different entities likewise offer shields and associated structures. However, the industry has not adopted a universal connector size on conduits that are joined to the shields. Thus, if a consumer wishes to buy the shield and vacuum source from different entities, he/she must make certain that the connecting structures between the conduits and shields are compatible.

Currently, there is a common basic design with connectors on the shield and conduit—each having cylindrical surfaces that frictionally engage by being relatively moved into a telescoping relationship.

Each shield is provided with an adaptor with a fixed dimension, cylindrical engaging surface. Consequently, for those suppliers of the shield structure, multiple different versions of the shield structure must be offered to be compatible with the different conduit connectors offered throughout the industry.

The need to offer multiple different versions of the shield structure increases the number of parts that must be kept on hand and complicates inventory control.

The industry continues to seek out design alternatives whereby it is economically and logistically practical to offer shields to accommodate different conduit connectors commonly having different associated conduit diameters.

SUMMARY OF THE INVENTION

In one form, the invention is directed to a system for collecting debris produced as a result of cutting through a surface of a component. The system includes: a shield configured to be placed in an operative position against a component surface whereupon the shield and component surface cooperatively define an accumulation volume; and an adaptor on the shield configured to be releasably operatively engaged by first, second, and third connectors. The shield has at least one opening communicating from the accumulation volume to externally of the shield. The first, second, and third connectors have different configurations whereat the first, second, and third connectors releasably operatively engage the adaptor. The first, second, and third connectors are respectively on first, second, and third conduits, each with a passage. The first, second, and third connectors are releasably operatively engageable with the adaptor, one in place of the others. A communication path is defined from the accumulation volume through the at least one shield opening into the passage on one of the first, second, and third conduits on a selected one of the first, second, and third connectors that is releasably operatively engaged with the adaptor. The communication path is usable to direct debris produced from cutting through a surface of a component from the collection volume to externally of the shield.

In one form, the system is provided in combination with a vacuum source for generating a low-pressure region to cause movement of debris produced from cutting through the surface from the accumulation volume to a location externally of the shield.

In one form, the system is provided in combination with a rotary cutting tool that is connected to the shield and operable to cut through a surface of a component.

In one form, the cutting tool is operated by a drive located externally of the shield.

In one form, the adaptor has one cylindrical surface and the first connector has one cylindrical surface. With the first connector releasably operatively engaged with the adaptor, one of: a) the one cylindrical surface on the adaptor; and b) the one cylindrical surface on the first connector surrounds and frictionally engages the other of the one cylindrical surface on the adaptor and the one cylindrical surface on the first connector.

In one form, the adaptor has another cylindrical surface and the second connector has another cylindrical surface. With the second connector releasably operatively engaged with the adaptor, one of: a) the another cylindrical surface on the adaptor; and b) the another cylindrical surface on the second connector surrounds and frictionally engages the other of the another cylindrical surface on the adaptor and the another cylindrical surface on the second connector.

In one form, the adaptor has a further cylindrical surface and the third connector has a further cylindrical surface. With the third connector releasably operatively engaged with the adaptor, one of: a) the further cylindrical surface on the adaptor; and b) the further cylindrical surface on the third connector surrounds and frictionally engages the other of the further cylindrical surface on the adaptor and the further cylindrical surface on the third connector.

In one form, the one cylindrical surface, the another cylindrical surface, and the further cylindrical surface on the adaptor have a same central axis.

In one form, the one cylindrical surface on the adaptor has a central axis. The one cylindrical surface on the adaptor has a non-uniform diameter along an axial length of the one cylindrical surface on the adaptor.

In one form, the system includes the first connector and the one cylindrical surface on the first connector has a central axis. The one cylindrical surface on the first connector has a non-uniform diameter along an axial length of the one cylindrical surface on the first connector.

In one form, the shield has a cup-shaped body with a peripheral wall extending around an axis, a top wall, and a bottom opening at the bottom of the peripheral wall. The cup-shaped body has an outturned flange at the bottom of the peripheral wall that is abuttable to a surface of a component whereby the surface of the component blocks the bottom opening on the cup-shaped body.

In one form, the top wall is axially collapsible.

In one form, the system is provided in combination with a rotary cutting tool. A bearing is provided on the top wall of the cup-shaped body to guide rotary movement of the rotary cutting tool.

In one form, the peripheral wall has a locally reinforced region. The at least one opening on the shield extends through the locally reinforced region of the peripheral wall.

In one form, a releasable cap has a surface that surrounds and frictionally engages one of the one cylindrical surface, the another cylindrical surface, and the further cylindrical surface on the adaptor and blocks the at least one shield opening.

In one form, the shield is configured so that with the top wall axially collapsed the top wall defines an upwardly opening cup shape.

In one form, the rotary cutting tool is configured to produce a hole in a component surface as the rotary cutting tool is operated.

In one form, the adaptor consists of first and second joinable parts which capture the peripheral wall at the locally reinforced region to maintain the adaptor operatively connected to the peripheral wall.

In one form, the system is provided in combination with at least one of: a) the first connector on the first conduit; b) the second connector on the second conduit; and c) the third connector on the third conduit.

In one form, the system is provided in further combination with a source of vacuum for generating a low-pressure region in the passage on a selected one of the: a) first conduit and the first connector; b) the second conduit and the second connector; and c) the third conduit and the third connector.

In one form, the adaptor is permanently connected to the shield.

In one form, the adaptor is releasably connected to the shield.

DETAILED DESCRIPTION OF THE PREFERRED EMBODIMENT

Figures 1, 2, 3, 4, 5:
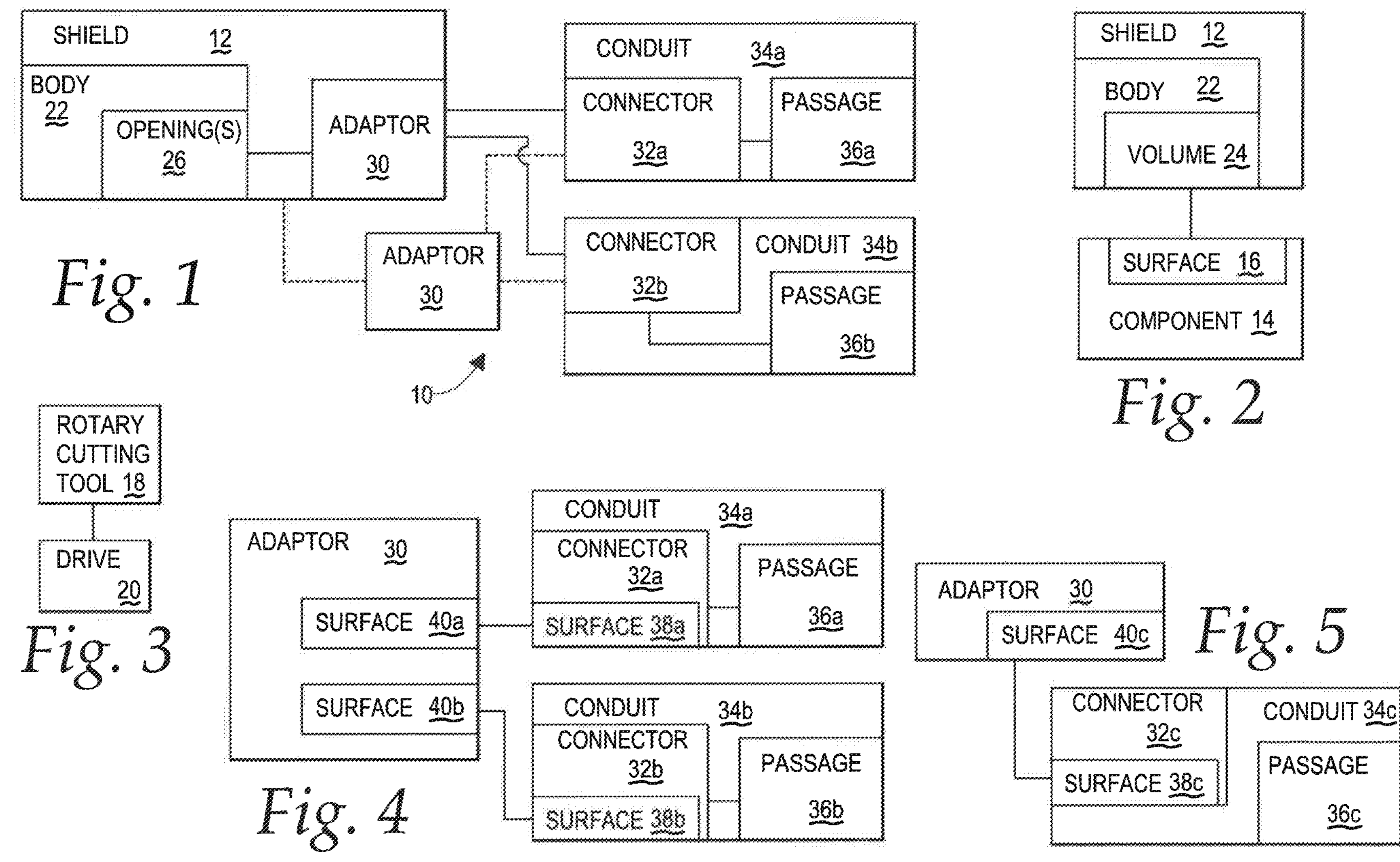
FIG. 1 is a schematic representation of a system for collecting debris generated through cutting a component, according to the present invention, together with releasably engageable conduits.
FIG. 2 is a schematic representation of a shield on the system in FIG. 1 placed against a surface on a component to be cut.
FIG. 3 is a schematic representation of a driven rotary cutting tool usable in conjunction with the shield in FIGS. 1 and 2.
FIG. 4 is a schematic representation showing additional details of certain components on the system and conduits in FIG. 1.
FIG. 5 is a schematic representation of a modified form of adaptor as used on the system in FIG. 1 and with an additional conduit.

In FIG. 1, a system for collecting debris, produced as a result of cutting through a surface of a component, is shown schematically at 10 and includes a shield 12. The particular cutting process performed, as well as the nature of the component upon which the cutting operation is performed, are not critical to the invention.

In FIG. 2, a schematic depiction of a component is shown at 14 with a surface 16 through which cutting is effected. Essentially, the schematic depiction in FIG. 2 is intended to encompass any component 14 that generates debris when it is treated as by cutting through the surface 16 thereof. For example, the component 14 may be a section of drywall through which a cutout is formed. Any process is contemplated that produces debris, typically in the form of dust and/or other loose particles that are light enough that they can be controllably accumulated in a manner whereby a worker is shielded from exposure thereto during an operation.

Most commonly, the system is used in conjunction with a rotary cutting tool, as shown schematically at 18 in FIG. 3, that is rotated by a drive 20. As the rotary tool 18 is operated, it penetrates the component surface 16 to generate dust and other debris controllable using the system 10.

Referring again to the system as depicted in FIG. 1, and with additional reference to FIG. 2, the shield 12 has a body 22 which extends around an open volume 24. With the shield 12 placed in an operative position against the surface 16, the shield 12 and component surface 16 cooperatively define a blocked accumulation volume. For purposes of simplicity, the accumulation volume will be identified as the volume 24.

The shield 12 has at least one opening 26 communicating from the accumulation volume 24 to externally of the shield 12.

With reference additionally to FIG. 4, the system in FIG. 1 further has an adaptor 30 on the shield 12 configured to be releasably operatively engaged by a selected one of first and second connectors 32*a*, 32*b*, respectively on conduits 34*a*, 34*b*. The conduits 34*a*, 34*b* have passages 36*a*, 36*b*, respectively.

As shown in FIG. 1, the adaptor 30 may be considered to be part of the shield or alternatively, as shown in dotted lines, a component separately formed and integrated into the shield 12.

The first and second connectors 32*a*, 32*b* have different configurations whereat they releasably operatively engage the adaptor 30.

The first and second connectors 32*a*, 32*b* are releasably operatively engageable with the adaptor 30, one in place of the other, whereby a communication path is defined from the accumulation volume 24, through the at least one shield opening 26 and into the passage 36*a* or 36*b* on the one of the first and second conduits 34*a*, 34*b* that is selected to be releasably connected to the adaptor 30 through its respective connector 32*a*, 32*b*.

The communication path defined is usable to direct debris produced from cutting through the surface 16 from the accumulation volume 24, through the at least one shield opening 26, and into the passage 36*a* or 36*b*.

As seen in FIG. 4, the connector 32*a* is releasably operatively connected to the adaptor 30 through a surface 38*a* that cooperates with a surface 40*a* on the adaptor 30, with the surfaces 38*a*, 40*a* in a relationship with one surrounding the other so as to produce a frictional holding force that maintains the connector 32*a* releasably operatively engaged with the adaptor 30. The connector 32*b* has a surface 38*b*, corresponding to the surface 38*a*, that cooperates with a surface 40*b* on the adaptor, corresponding to the surface 40*a* thereon.

The cooperating inside and outside surfaces may have different peripheral shapes, with one exemplary surface shape being cylindrical, as described in specific forms hereinbelow.

While the cooperating surfaces 38, 40 are characterized as "cylindrical", it should be understood that "cylindrical", as used to characterize the surfaces 38, 40 in the description and claims herein, also encompasses surfaces that taper between axial ends. Further, the surfaces 38, 40 will be considered to be "cylindrical" even if they are textured, as by having annular ribs thereon, which enhance frictional holding.

The adaptor 30 may be designed to accommodate any number of connectors 32 in the same fashion. In FIG. 5 a third connector 32*c* is schematically depicted on a conduit 34*c* having a passage 36*c*.

Using the exemplary cylindrical form of the surfaces 38, 40, in one form, the adaptor 30 has one cylindrical surface 40*a* with a first connector 32*a* having one cylindrical surface 38*a*. With the first connector 32*a* releasably operatively engaged with the adaptor 30, one of: a) the one cylindrical surface 40*a* on the adaptor 30; and b) the one cylindrical surface 38*a* on the first connector 32*a* surrounds and frictionally engages the other of the one cylindrical surface 40*a* on the adaptor 30 and the one cylindrical surface 38*a* on the first connector 32*a*.

The adaptor 30 has another cylindrical surface 40*b*, with the second connector 32*b* having another cylindrical surface 38*b*. With the second connector 32*b* releasably operatively engaged with the adaptor 30, one of: a) the another cylindrical surface 40*b* on the adaptor 30; and b) the another cylindrical surface 38*b* on the second connector 32*b* surrounds and frictionally engages the other of the another cylindrical surface 40*b* on the adaptor 30 and the another cylindrical surface 38*b* on the second connector 32*b*.

As shown in FIG. 5, the adaptor 30 may be configured so that the third connector 32*c* on the conduit 34*c* is releasably operatively engageable with the adaptor 30. The third connector 32*c* has a configuration whereat the third connector 32*c* engages the adaptor 30 that is different than the configurations of the first and second connectors 32*a*, 32*b* whereat they engage the adaptor 30. The third connector 32*c* is releasably operatively engageable with the adaptor 30 in place of the first and second connectors 32*a*, 32*b* whereby a communication path is defined from the accumulation volume 24, through the at least one shield opening 26 into the passage 36*c* on the third conduit 34*c*.

With the connector 32*c* and adaptor 30 engaged through cooperating cylindrical surfaces, the adaptor 30 has a further cylindrical surface 40*c*, with the third connector 32*c* having a further cylindrical surface 38*c*. With the third connector 32*c* releasably operatively engaged with the adaptor 30, one of: a) the further cylindrical surface 40*c* on the adaptor 30; and b) the further cylindrical surface 38*c* on the third connector 32*c* surrounds and frictionally engages the other of the further cylindrical surface 40*c* on the adaptor 30 and the further cylindrical surface 38*c* on the third connector 32*c*.

There is no specific required relationship between the multiple surfaces 38 on the connectors 32 and the surfaces 40 on the adaptor 30.

Preferably, all of the surfaces 38, 40 that cooperate are press fit through relative movement along their axes. The desired frictional holding force may be established by texturing the surfaces, controlling relative diameters and tapers, allowing a certain degree of compression, etc., as well known to those skilled in the art. Supplemental holding may be provided, if necessary.

The schematic depiction of the components in FIGS. 1-6 is intended to encompass virtually an unlimited number of different forms of each of the components and their interaction, which would be evident to one skilled in the art with the teachings herein in hand. The specific forms of the invention described hereinbelow are exemplary in nature only and should not be viewed as limiting.

Referring now to FIGS. 6-15, specific exemplary forms of the system 10, as schematically depicted in FIGS. 1-5, will be described.

The body 22 of the shield 12 is shown as generally cup-shaped with a peripheral wall 42 extending around an axis 44, and a top wall 46. A bottom opening 48 is provided at the bottom of the peripheral wall 42. Without limitation, the body 22 is shown with a plastic construction.

An outturned flange 50 at the bottom of the peripheral wall 42 defines an annular surface area 52 that is abuttable to the surface 16 of the component 14 whereby the component 14 blocks the opening 48 and thereby bounds the volume 24 in conjunction with the shield body 22.

A bearing 54 is provided on the top wall 46 and supports the rotary cutting tool 18 for guided rotary movement—directly or through the drive 20.

Figures 13, 14, 15, 16, 17:
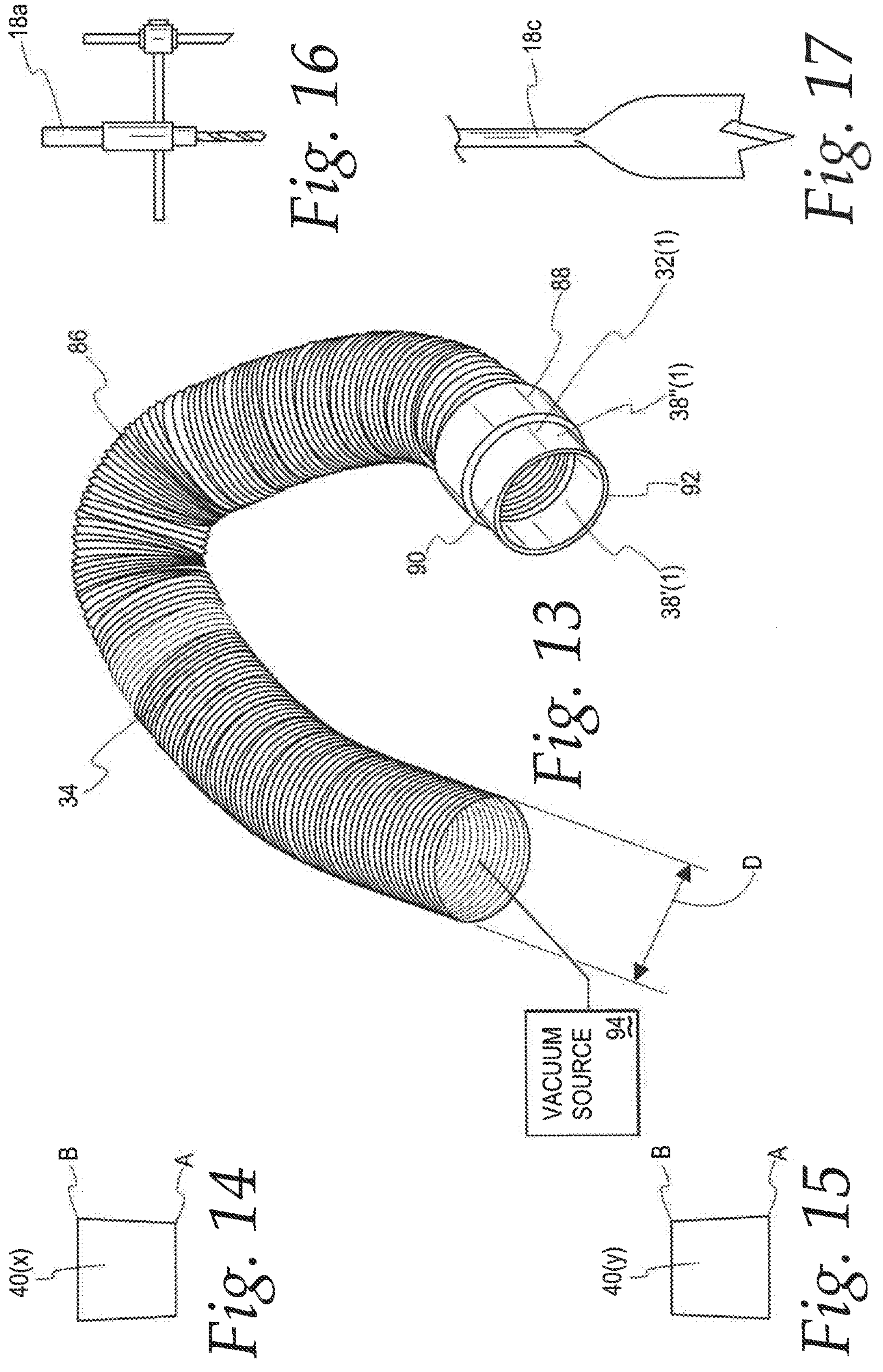
FIG. 13 is a perspective view showing one exemplary form of conduit and associated connector, as shown schematically in FIG. 1.
FIGS. 14 and 15 are schematic representations showing different adaptor surfaces to engage connectors and with different tapering directions.
FIGS. 16 and 17 are elevation views showing different forms of cutting tools as shown schematically in FIG. 3.

As noted, the depiction of the rotary cutting tool 18 in the schematic form is intended to encompass virtually an unlimited number of different cutting tools. As just examples, in FIG. 16 an adjustable hole cutting tool 18*a* of conventional form is depicted. In FIG. 17 a fixed configuration boring bit 18*c* is shown, likewise with a conventional construction.

Figure 7:
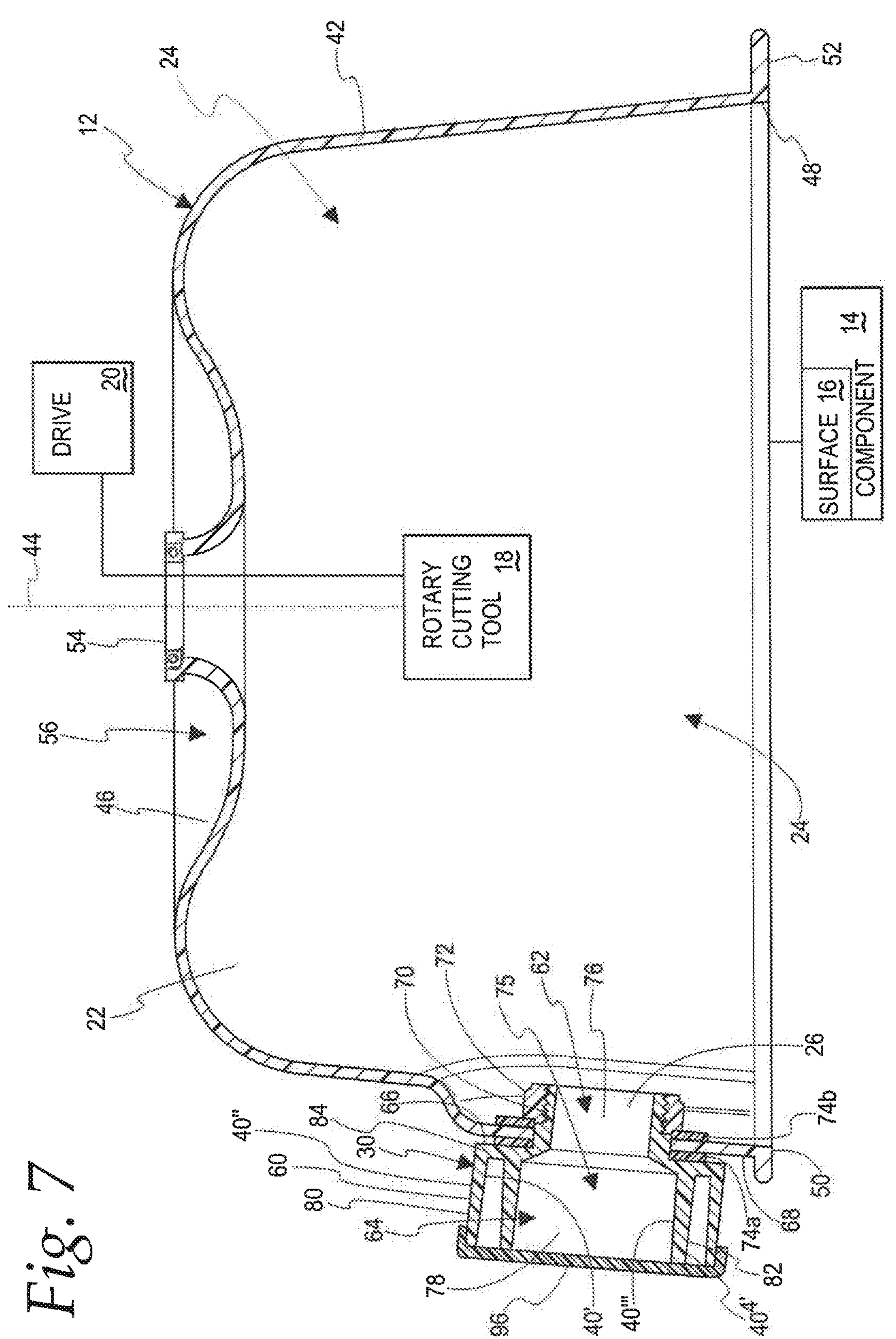
FIG. 7 is a cross-sectional view of the shield taken along line 7-7 of FIG. 6.

As shown schematically in FIG. 7, the rotary cutting tool 18 resides within the volume 24 and is engaged to be operated through the external drive 20, situated outside of the volume 24, with the drive 20 having any suitable known construction.

Figure 6:
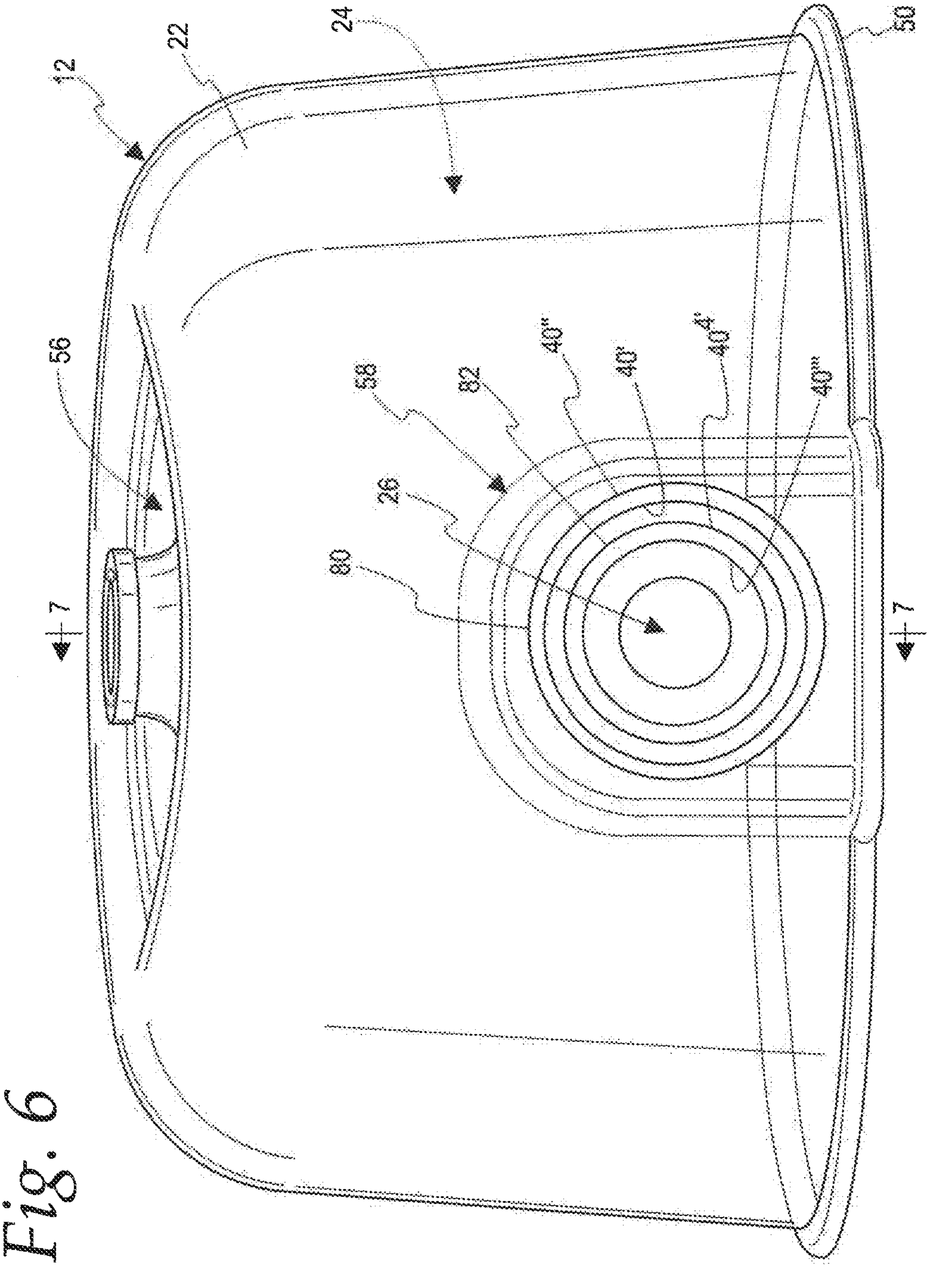
FIG. 6 is a side elevation view of an exemplary form of shield, as shown schematically in FIG. 1.
Figure 8:
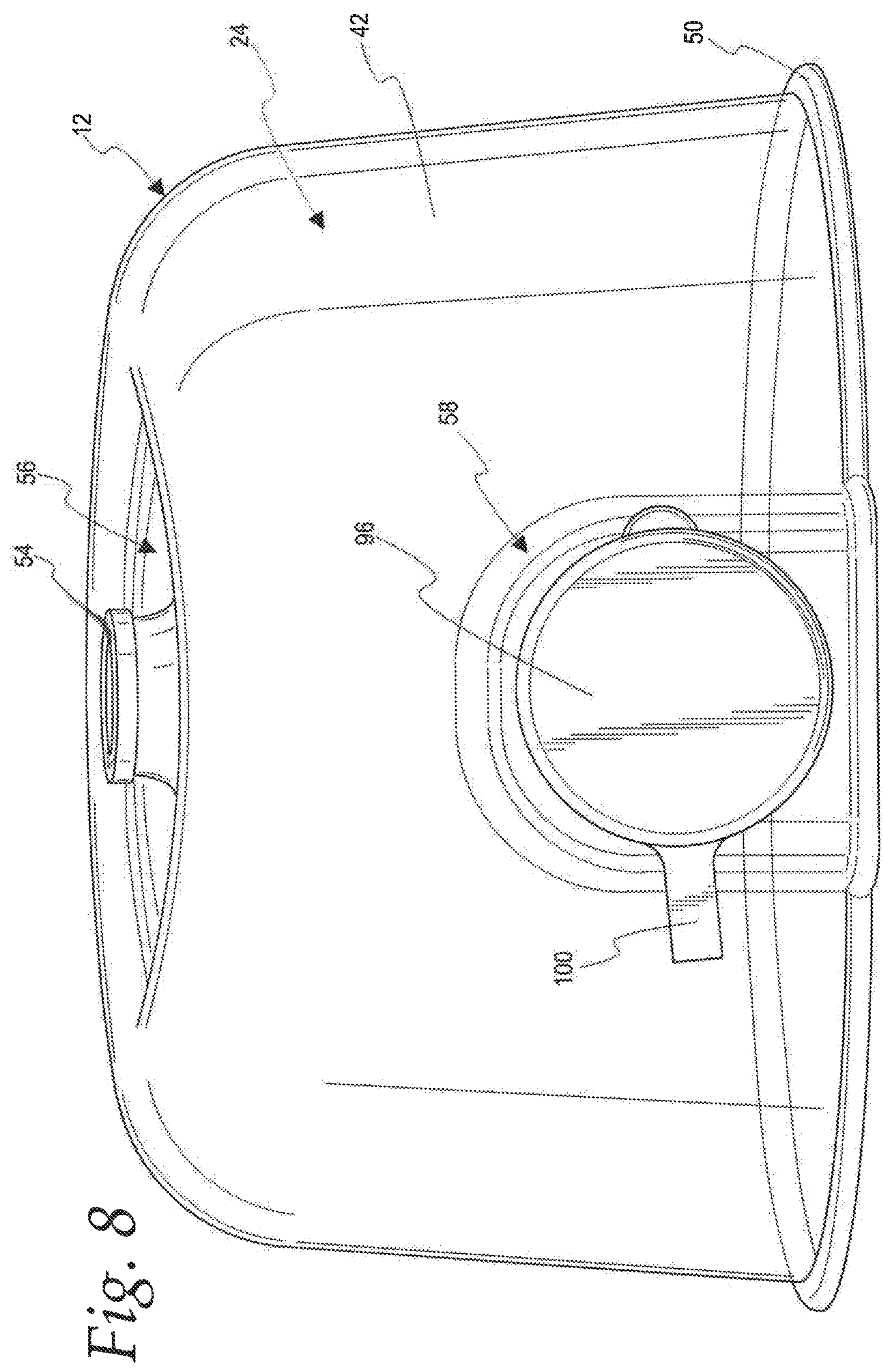
FIG. 8 is a view as in FIG. 6 wherein a cap has been placed on the shield to block an opening communicating through a peripheral wall on the shield.

In FIGS. 6-8, the shield body 22 is shown in one starting state wherein the top wall 46 is convexly curved with a locally concave annular region at 56, extending a short radial distance away from the axis 44.

Figure 10:
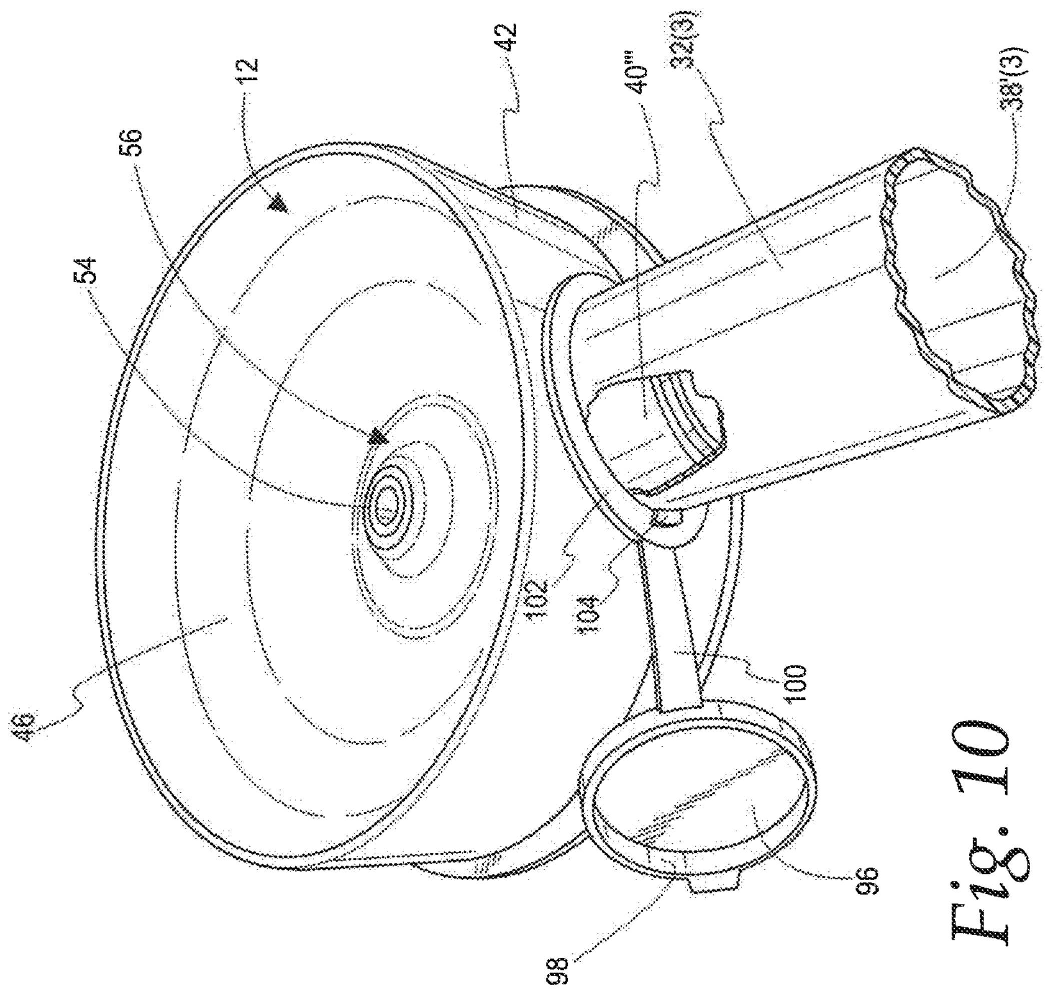
FIG. 10 is a perspective view of the shield as shown in FIGS. 6-8 in a collapsed state and with one conduit connector releasably operatively engaged with the adapter on the shield.
Figures 11, 12:
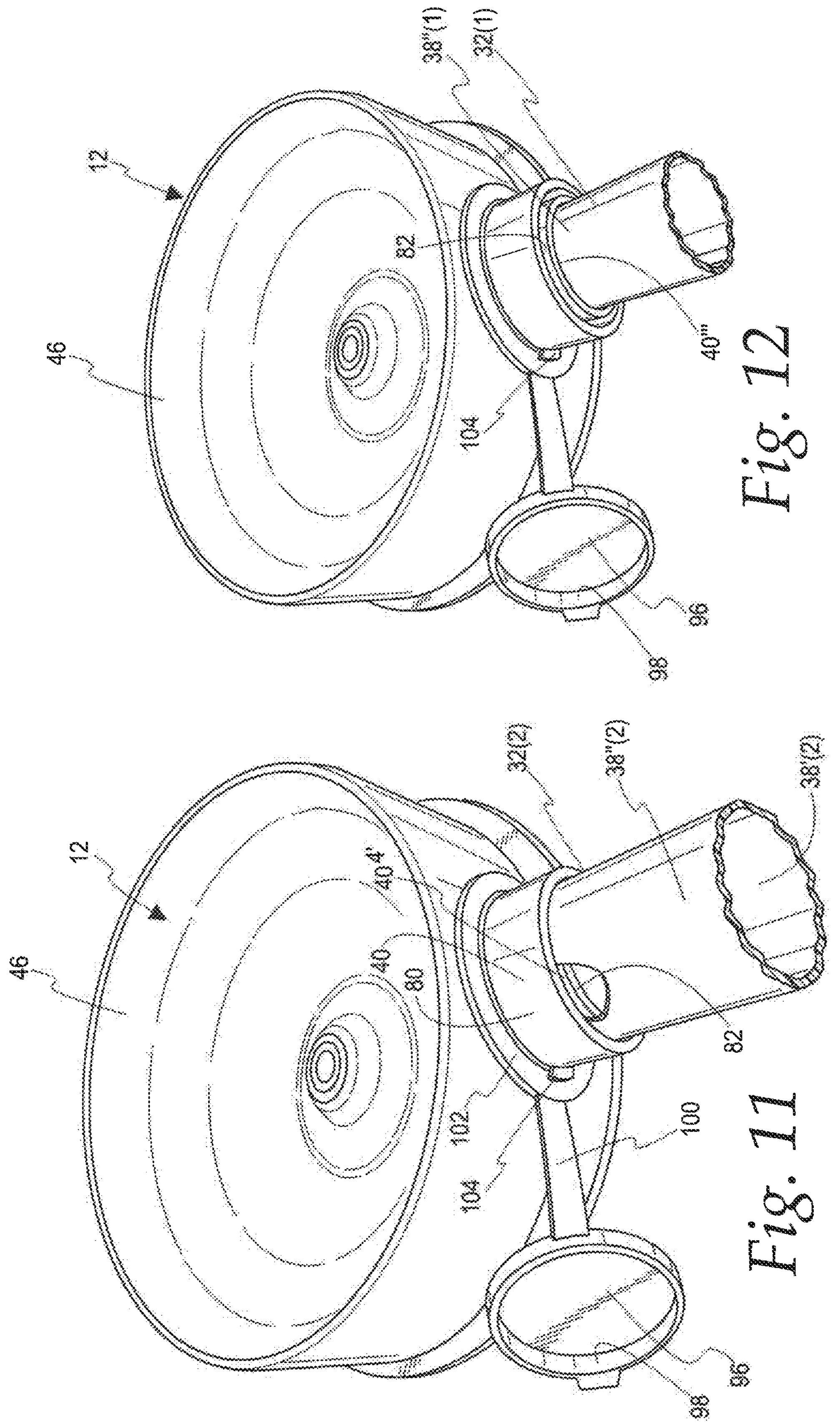
FIG. 11 is a view as in FIG. 10 wherein a different connector is releasably operatively engaged with the adaptor.
FIG. 12 is a view as in FIGS. 10 and 11 wherein a connector, different than that in FIGS. 10 and 11, is shown releasably operatively engaged with the adaptor.

The top wall 46 is axially collapsible to the state shown in FIGS. 10-12 wherein the top wall assumes an upwardly opening cup shape, with the initially concave region 56 converting to a convex shape. This collapsed configuration rigidifies the shield 12, particularly at the top wall 46.

It should be understood that the shield 12 is not required to be collapsible and may at all times have a substantially fixed shape.

The peripheral wall 42 is contoured to define a locally reinforced region at 58 through which the opening 26 extends to communicate from the accumulation volume 24 to externally of the shield 12.

As depicted, the adaptor 30 has a body 60 with a stepped diameter including a smaller diameter portion 62 and a larger diameter portion 64. At the transition between the smaller diameter portion 62 and the larger diameter portion 64, an annular shoulder 66 is defined. With the smaller diameter portion 62 directed through the opening 26, the shoulder 66 confronts the external surface 68 of the body 22. With the body 60 pressed fully into its assembled position, external threads 70 on the smaller diameter portion 62 of the body 60 are exposed to be threadably engaged by a fastening nut 72. Tightening the nut 72 fixedly mounts the adaptor 30 in place on the body 22 by capturing a region of the peripheral wall 42 between joined parts—the body 60 and nut 72. Optional annular seals 74*a*, 74*b* may be compressed between the fastening nut 72 and the shoulder 66, on opposite sides of the peripheral wall 42, to establish a more airtight connection at the opening 26.

A stepped diameter bore 75 is formed through the adaptor 60 with a smaller diameter portion 76 and a larger diameter portion 78. The smaller diameter portion 76 effectively reduces the diameter of the opening 26.

The larger diameter portion 64 has concentric annular rings 80, 82 projecting away from an annular base wall 84 at the transition between the smaller and larger diameter portions 62, 64, and upon which the shoulder 66 is defined.

FIG. 13 shows a typical construction of a conduit 34 with a connector 32(1). The depicted conduit 34 has an expandable and bendable body 86 with the connector 32(1) having a portion at 88 surrounding the body 86 and fixed thereto. The connector 32(1) has a leading cylindrical portion 90 extending away from the portion 88 and terminating at a free end 92. The cylindrical portion 90 has an inside cylindrical surface 38'(1) and an outside cylindrical surface 38"(1).

The ring 80 defines a radially inwardly facing cylindrical surface 40' and a radially outwardly facing cylindrical surface 40". The ring 82 defines a radially inwardly facing cylindrical surface 40'" and a radially outwardly facing cylindrical surface $\mathbf{40}^{4'}$.

While not required, the connector surfaces 38 are generally scaled in diameter corresponding to the diameters of the conduits 34 upon which they are mounted. The conduit sizes are typically commercially identified by the diameter of the body 86 as shown at D in FIG. 13. Typical conduit diameters (D) currently offered commercially are: a) 1.25 inch; b) 1.875 inch; and c) 2.5 inch.

The exemplary connector 32(1) in FIG. 13 will be treated as the connector associated with the smallest diameter conduit, which may or may not be 1.25 inch in diameter. The inner ring 82 is dimensioned so that, as seen in FIG. 12, the cylindrical surface 38"(1) will be press fit within the adaptor surface 40'" so that this engaged relationship is frictionally maintained.

In FIG. 11, a connector 32(2) corresponds to that on the middle size conduit, such as the 1.875 inch diameter conduit, and has a radially inwardly facing surface 38'(2) and a radially outwardly facing surface 38"(2). With the connector 32(2) releasably operatively engaged by being press fit, the radially inwardly facing surface 38'(2) surrounds and frictionally engages the adaptor surface $\mathbf{40}^{4'}$ while the radially outwardly facing surface 38"(2) is slightly spaced from the adaptor surface 40'.

The connector 32(3) as shown in FIG. 10, has a cylindrical inside surface 38'(3) that frictionally engages the adaptor surface 40'" with the connector 32(3) and adaptor 30 releasably operatively engaged.

Figure 9:
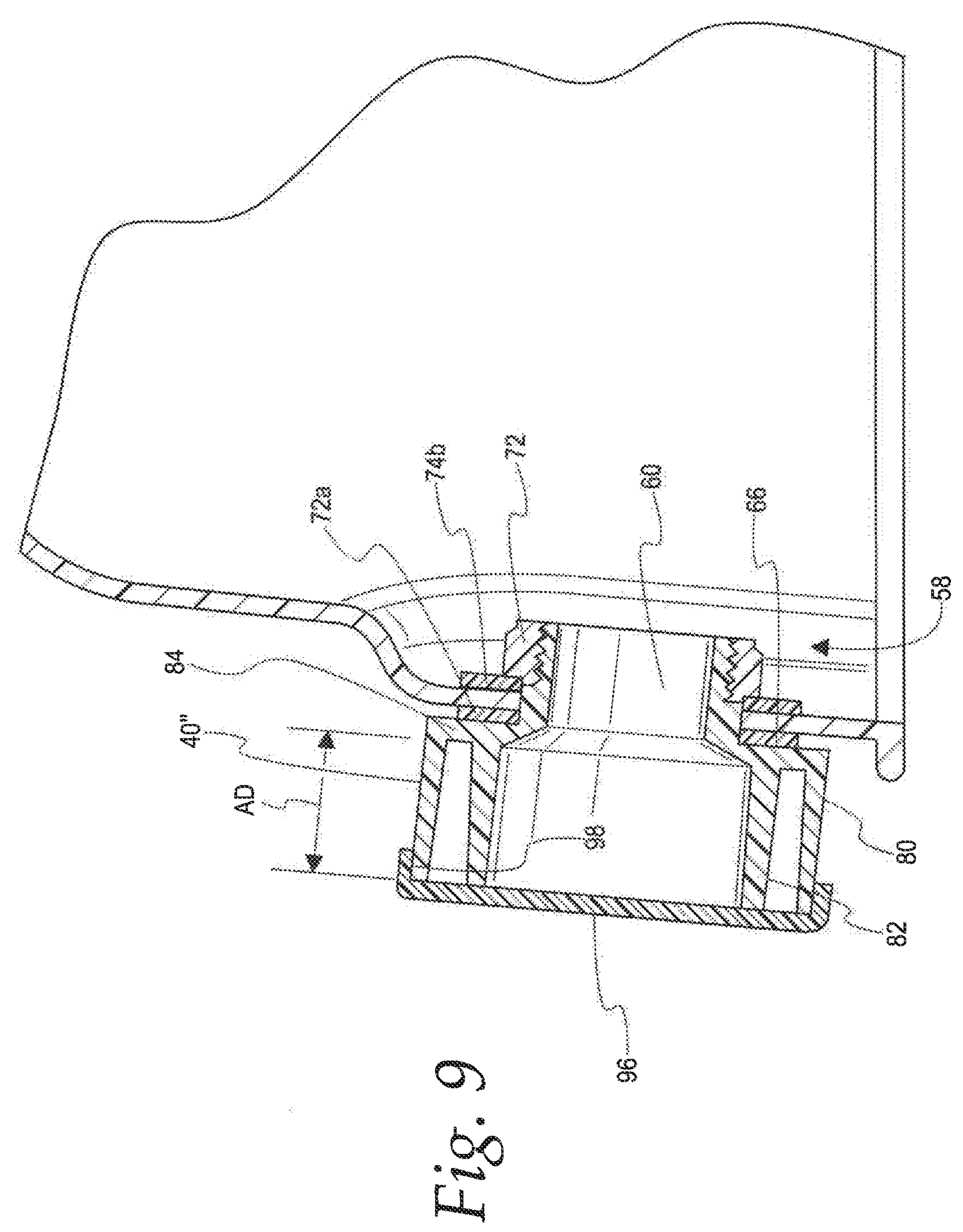
FIG. 9 is an enlarged view of a portion of the cross-sectioned shield and adaptor as shown in FIG. 7.

The seating axial dimension AD for the connectors 32, as shown in FIG. 9, is not critical and is dictated by the relationship of the surfaces 38, 40, including their relative dimensions, surface texture, deformability as dictated by materials, etc. Commonly, this dimension AD may be on the order of 0.75 inch to 1.5 inches, with this range being simply representative, as dimensions substantially less and greater are contemplated.

In the exemplary commercial embodiment, as shown schematically in FIGS. 14 and 15, all of the cylindrical adaptor surfaces 40 are slightly tapered between their axial ends—A: furthest from the shield body 22 and B: closest to the shield body 22. FIG. 14 schematically depicts surfaces 40($x$) with a diameter that tapers from B to A, whereas in FIG. 15 the surfaces 40($y$) are shown with diameters tapering from A to B.

The adaptor surface 40'" corresponds to the surface 40($y$), with the diameter A being 1.33 inches and the diameter B being 1.31 inches.

The surfaces $\mathbf{40}^{4'}$ and 40" are in the category of the surface 40($x$), with the former having the dimensions A=1.55 inches and B=1.58 inches and the latter having the dimensions A=2.07 inches and B=2.1 inches.

As shown schematically in FIG. 13, the conduit 34 is connected to a vacuum source 94 that generates a low-pressure region downstream in the communication path to cause movement of debris produced from cutting from the accumulation volume 24 to a location externally of the shield, as for appropriate collection thereat.

It is also contemplated that the shield 12 may be used without utilizing a vacuum to draw debris from the accumulation volume 24. A blocking cap 96 has a cylindrical surface 98 that press fits around one of the adaptor surfaces 40. In this case, the surface 98 is shown in FIGS. 8-10 to be press fit in surrounding frictional engagement with the adaptor surface 40" to thereby block the shield opening 26. The connection may be tight enough that the opening 26 is substantially sealed, whereby the shield 12 will effectively contain debris generated within the accumulation volume 24.

A tether 100 connects between the cap 96 and the shield body 22—in this case having a ring 102 surrounding the adaptor 40 and blocked from easily sliding thereof by a tab 104.

Figure 18:
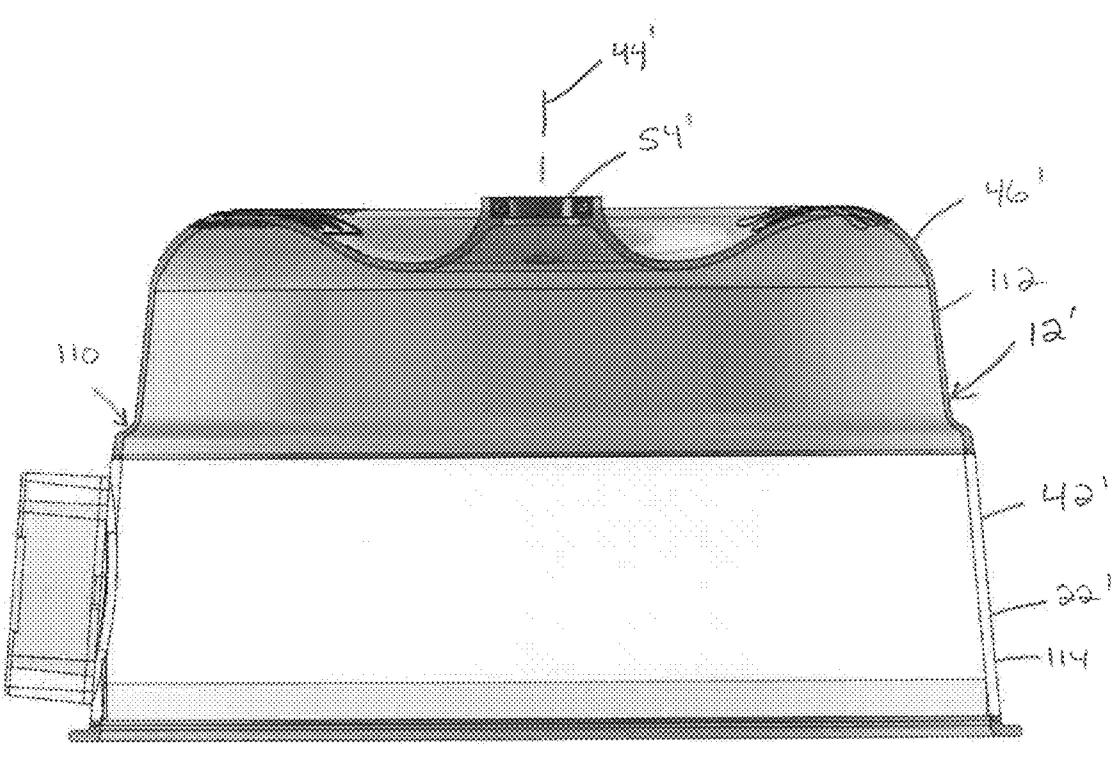
FIG. 18 is a cross-sectional view corresponding to that in FIG. 7 and showing a modified form of shield, according to the invention.

In FIG. 18, a modified form of shield, according to the invention, is shown at 12', with parts corresponding to those on the shield 12 identified with the same reference numbers with the addition of a "'" designation.

The shield 12' has a body 22' with a cup shape. The body 22' has a peripheral wall 42' extending around an axis 44', and a top wall 46' supporting a bearing 54'. A stepped region is defined at 110 where axially spaced and tapering portions 112, 114 of the peripheral wall 42' meet. The wall portion 114 is shown with a greater radial thickness, relative to the axis 44', than the wall portion 112.

In this embodiment, the adaptor 30' is integrally formed, as by molding, with the wall portion 114. Molding produces a single-piece construction. Permanent connection of the shield 12' and adaptor 30' is also contemplated.

The adaptor 30' is shown with substantially the same shape as the adaptor 30 where it is exposed to interact with the aforementioned connectors 32 and to accommodate an optional cap, corresponding to the cap 96, described above.

The foregoing disclosure of specific embodiments is intended to be illustrative of the broad concepts comprehended by the invention.

The invention claimed is:

1. A system for collecting debris produced as a result of cutting through a surface of a component, the system comprising:

a shield configured to be placed in an operative position against a component surface whereupon the shield and component surface cooperatively define an accumulation volume, the shield having at least one opening communicating from the accumulation volume to externally of the shield, the system further comprising an adaptor on the shield configured to be releasably operatively engaged by first, second, and third connectors, the first, second, and third connectors having different configurations whereat the first, second, and third connectors releasably operatively engage the adaptor, the first, second, and third connectors respectively on first, second, and third conduits, each with a passage, the first, second, and third connectors releasably operatively engageable with the adaptor, one in place of the others, whereby a communication path is defined from the accumulation volume through the at least one shield opening into the passage on one of the first, second, and third conduits on a selected one of the first, second, and third connectors that is releasably operatively engaged with the adaptor, the communication path usable to direct debris produced from cutting through a surface of a component from the collection volume to externally of the shield; and wherein:

the adaptor has one cylindrical surface and the first connector has one cylindrical surface, and with the first connector releasably operatively engaged with the adaptor one of: a) the one cylindrical surface on the adaptor; and b) the one cylindrical surface on the first connector surrounds and frictionally engages the other of the one cylindrical surface on the adaptor and the one cylindrical surface on the first connector;

the adaptor has another cylindrical surface and the second connector has another cylindrical surface and with the second connector releasably operatively engaged with the adaptor, one of: a) the another cylindrical surface on the adaptor; and b) the another cylindrical surface on the second connector surrounds and frictionally engages the other of the another cylindrical surface on the adaptor and the another cylindrical surface on the second connector;

the adaptor has a further cylindrical surface and the third connector has a further cylindrical surface and with the third connector releasably operatively engaged with the adaptor one of: a) the further cylindrical surface on the adaptor; and b) the further cylindrical surface on the third connector surrounds and frictionally engages the other of the further cylindrical surface on the adaptor and the further cylindrical surface on the third connector;

the one cylindrical surface, the another cylindrical surface, and the further cylindrical surface on the adaptor have a same central axis; and a releasable cap has a surface that surrounds and frictionally engages one of the one cylindrical surface, the another cylindrical surface, and the further cylindrical surface on the adaptor and blocks the at least one shield opening.

2. The system for collecting debris according to claim 1 further comprising a vacuum source for generating a low-pressure region to cause movement of debris produced from cutting through the surface from the accumulation volume to a location externally of the shield.

3. The system for collecting debris according to claim 1 further comprising a rotary cutting tool that is connected to the shield and operable to cut through a surface of a component.

4. The system for collecting debris according to claim 3 wherein the cutting tool is operated by a drive located externally of the shield.

5. The system for collecting debris according to claim 3 wherein the rotary cutting tool is configured to produce a hole in a component surface as the rotary cutting tool is operated.

6. The system for collecting debris according to claim 1 wherein the shield comprises a cup-shaped body with a peripheral wall extending around an axis, a top wall, and a bottom opening at the bottom of the peripheral wall, the cup-shaped body having an outturned flange at the bottom of the peripheral wall that is abuttable to a surface of a component whereby the surface of the component blocks the bottom opening on the cup-shaped body.

7. The system for collecting debris according to claim 6 wherein the top wall is axially collapsible.

8. The system for collecting debris according to claim 7 wherein the shield is configured so that with the top wall axially collapsed the top wall defines an upwardly opening cup shape.

9. The system for collecting debris according to claim 6 further comprising a rotary cutting tool and a bearing is provided on the top wall of the cup-shaped body to guide rotary movement of the rotary cutting tool.

10. The system for collecting debris according to claim 6 wherein the peripheral wall has a locally reinforced region and the at least one opening on the shield extends through the locally reinforced region of the peripheral wall.

11. The system for collecting debris according to claim 10 wherein the adaptor consists of first and second joinable parts which capture the peripheral wall at the locally reinforced region to maintain the adaptor operatively connected to the peripheral wall.

12. The system for collecting debris according to claim 1 in combination with at least one of: a) the first connector on the first conduit; b) the second connector on the second conduit; and c) the third connector on the third conduit.

13. The system for collecting debris according to claim 12 further comprising a source of vacuum for generating a low-pressure region in the passage on a selected one of the: a) first conduit and the first connector; b) the second conduit and the second connector; and c) the third conduit and the third connector.

14. The system for collecting debris according to claim 1 wherein the adaptor is permanently connected to the shield.

15. The system for collecting debris according to claim 1 wherein the adaptor is releasably connected to the shield.

16. A system for collecting debris produced as a result of cutting through a surface of a component, the system comprising:

a shield configured to be placed in an operative position against a component surface whereupon the shield and component surface cooperatively define an accumulation volume, the shield having at least one opening communicating from the accumulation volume to externally of the shield, the system further comprising an adaptor on the shield configured to be releasably operatively engaged by first, second, and third connectors, the first, second, and third connectors having different configurations whereat the first, second, and third connectors releasably operatively engage the adaptor, the first, second, and third connectors respectively on first, second, and third conduits, each with a passage, the first, second, and third connectors releasably operatively engageable with the adaptor, one in place of the others, whereby a communication path is defined from the accumulation volume through the at least one shield opening into the passage on one of the first, second, and third conduits on a selected one of the first, second, and third connectors that is releasably operatively engaged with the adaptor, the communication path usable to direct debris produced from cutting through a surface of a component from the collection volume to externally of the shield; and wherein:

the adaptor has one cylindrical surface and the first connector has one cylindrical surface, and with the first connector releasably operatively engaged with the adaptor one of: a) the one cylindrical surface on the adaptor; and b) the one cylindrical surface on the first connector surrounds and frictionally engages the other of the one cylindrical surface on the adaptor and the one cylindrical surface on the first connector;

the adaptor has another cylindrical surface and the second connector has another cylindrical surface and with the second connector releasably operatively engaged with the adaptor, one of: a) the another cylindrical surface on the adaptor; and b) the another cylindrical surface on the second connector surrounds and frictionally engages the other of the another cylindrical surface on the adaptor and the another cylindrical surface on the second connector;

the adaptor has a further cylindrical surface and the third connector has a further cylindrical surface and with the third connector releasably operatively engaged with the adaptor one of: a) the further cylindrical surface on the adaptor; and b) the further cylindrical surface on the third connector surrounds and frictionally engages the other of the further cylindrical surface on the adaptor and the further cylindrical surface on the third connector; and a releasable cap has a surface that surrounds and frictionally engages one of the one cylindrical surface, the another cylindrical surface, and the further cylindrical surface on the adaptor and blocks the at least one shield opening.

* * * * *